(Model.)

S. R. BARHITE.
FRUIT JAR.

No. 321,272. Patented June 30, 1885.

WITNESSES
C. W. Lashiell.
E. G. Siggers.

INVENTOR
Samuel R. Barhite
By C. A. Snow & Co.
Attorneys

N. PETERS, Photo-Lithographer, Washington, D. C.

UNITED STATES PATENT OFFICE.

SAMUEL RUNDLE BARHITE, OF LEWIS, IOWA.

FRUIT-JAR.

SPECIFICATION forming part of Letters Patent No. 321,272, dated June 30, 1885.

Application filed March 28, 1885. (Model.)

*To all whom it may concern:*

Be it known that I, SAMUEL R. BARHITE, a citizen of the United States, residing at Lewis, in the county of Cass and State of Iowa, have invented a new and useful Improvement in Fruit-Jars, of which the following is a specification, reference being had to the accompanying drawings.

This invention is an improvement in sealing attachments for jars, bottles, and similar vessels, and has for an object to provide a simple, inexpensive, and efficient apparatus applicable to the ordinary large-mouthed jar or bottle.

The invention consists in the novel construction of the cover, and in the combination therewith of the several other parts, as will be hereinafter described.

Figure 1:
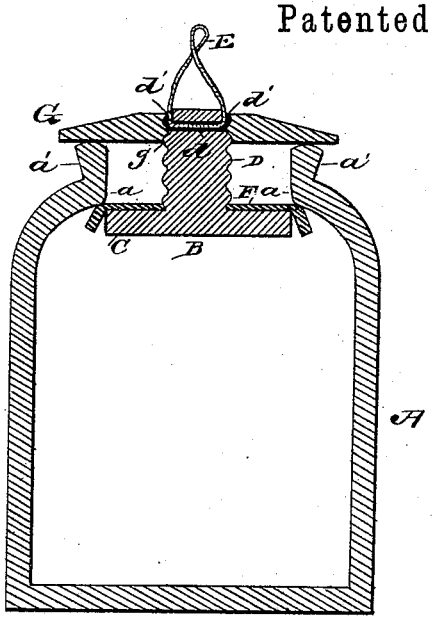
Figure 2:
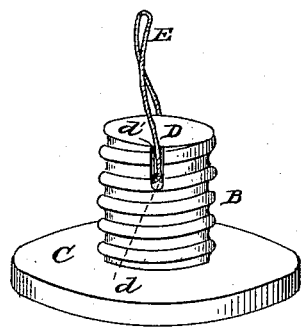
Figure 3:
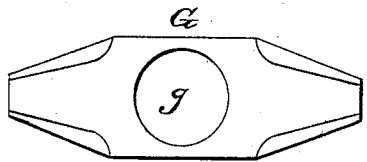
Figure 4:
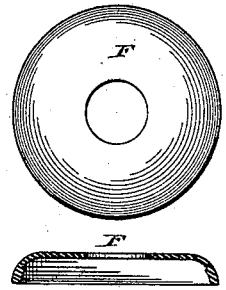

In the drawings, Figure 1 is a vertical longitudinal section of a jar and my improved sealing attachment in place thereon. Fig. 2 is a detail perspective view of the cover and its stem, showing the perforation and grooves of the stem and the cord. Fig. 3 is a plan view of the clamping-bar, and Fig. 4 represents the gasket or packing-ring in plan view and in transverse section.

The jar A may be of ordinary construction, and is formed with an internal shoulder, $a$, and an upwardly-projected neck, $a'$.

The cover or plug B is formed with the body or disk C, and the central stem, D, projected upwardly from said body, and threaded, as shown. This stem is perforated at $d$, usually near its extremity, and is provided with longitudinal grooves $d'$ $d'$, extending from said perforation $d$ to the extremity of the stem. A cord, E, is passed through perforation $d$, and is looped, resting on the opposite sides of the stem in the grooves $d$, so as not to interfere with the clamping-bar when the latter is being turned on or off the stem. This cord forms a convenient handle by which to support the plug or cover in the operation of the device, and also by which to move the jars, when hot, after sealing.

The disk C is slightly smaller than the internal diameter of the jar-mouth. When inserting the cover with the gasket placed over the disk, the latter is lowered either vertically or in an inclined line into the neck, which causes the periphery of the gasket to rise, since it is greater in diameter than the mouth. When the stopper is sufficiently below the mouth, the periphery of the gasket either falls automatically or is pushed onto the cover. This gasket, by its thickness, adds to the diameter of the cover, making it greater than the diameter of the mouth of the jar.

The gasket F, of rubber or other suitable substance, is slipped over the stem D, and supported on the upper side of the disk C. This gasket is made to extend beyond the periphery of the cover or plug, and is, by preference, slightly thicker in line with the outer edge of said cover. This gasket forms a bearing and packing for the cover against the shoulder $a$ of the jar, and by drawing up the stem D the jar may be sealed, more or less upward pressure being exerted on the stem, as may be required.

The clamping-bar G is provided with a central threaded opening, $g$, fitted to turn on the stem D, and is made of a length greater than the diameter of the cover, so that its ends will bear on the upper end of the neck of the jar.

The operation is as follows: The body of the cover is inserted through the neck of the jar, and the gasket also placed through said neck and pushed down between the body C and the shoulder $a$. By turning the bar G the stem and body will be drawn upward, the latter clamping the gasket snugly against the shoulder $a$, and such gasket operating to prevent the slipping of the body C out of the neck until said gasket has been first drawn away from the shoulder $a$. Thus, it will be seen, I secure an inward sealing independently of any peculiar formation of the jar, and by devices which can be entirely removed from the jar and conveniently replaced thereon. As before stated, the cord E serves as a handle for the cover, by which it may be supported when the clamping-bar is being turned onto or off the stem.

It will be noticed that the improvement dispenses with all ribs, lugs, and like formations on the neck and body of the jar.

By reason of the degree of adjustment permitted by the threaded stem and the clamping-bar turning thereon, the apparatus may be applied to jars with different lengths of neck; but I preferably use it in connection with a short-necked jar, as thereby the gasket can be more conveniently and accurately manipulated.

Having thus described my invention, what I claim, and desire to secure by Letters Patent, is—

The jar or vessel A, having the shoulder $a$, in combination with the disk C, provided with a threaded stem, D, and having its diameter less than the internal diameter of the mouth of the jar, the gasket F, having a central opening to slip over the stem D and cover the upper face of the disk, said gasket having its diameter greater than the disk, and its periphery made thicker, so as to cover the peripheral edge of the disk, and a clamping-bar, G, of a length greater than the diameter of the jar, and provided with a threaded central opening to engage the stem D, as set forth.

In testimony that I claim the foregoing as my own I have hereto affixed my signature in presence of two witnesses.

SAMUEL RUNDLE BARHITE.

Witnesses:
   M. J. DAVIS,
   R. A. KIEHL.